Dec. 4, 1956  H. E. MUCKLEY  2,772,932
PISTONS
Filed March 11, 1955
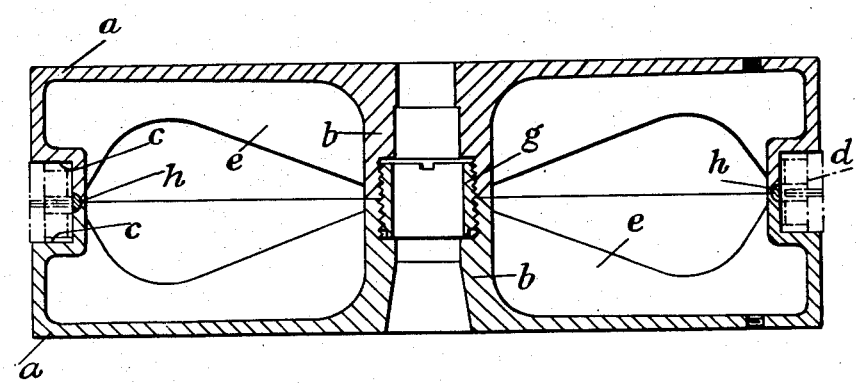
Inventor
H. E. Muckley

United States Patent Office 2,772,932
Patented Dec. 4, 1956

2,772,932

PISTONS

Henry Edward Muckley, Barnt Green, England, assignor to Belliss & Morcom Limited, Birmingham, England Application March 11, 1955, Serial No. 493,729

Claims priority, application Great Britain April 6, 1954

1 Claim. (Cl. 309—4)

This invention relates to pistons for air or other gas compressors, pumps, engines, and like reciprocatory machines, the object of the invention being to provide a hollow piston of improved construction.

A piston in accordance with the invention comprises a pair of similar halves of dished form each having a hollow screw-threaded boss at its centre and an annular step at its periphery, and a screw-threaded bush for interconnecting the inner ends of the bosses, the contiguous edges of the stepped parts being united by welding or the like.

The accompanying drawing is a sectional side elevation of a piston embodying the invention.

Referring to the drawing, each half $a$ is made as a hollow steel casting having a flat end face and a peripheral flange. At its centre each half has formed on it a hollow and inwardly extending boss $b$ for attachment to a piston rod. The periphery of each half is shaped to form an annular step $c$ such that when the two halves are placed together, the two steps form a circumferential groove for reception of piston rings $d$. Each half may also be stiffened by internal radial ribs $e$. Further the inner end of the bore of the boss is enlarged and screw threaded for engagement by an externally screw-threaded bush $g$.

The interconnection of the halves is effected in part by the bush. One end of this is first engaged with the boss on one of the halves, and the other half is then screwed on to the projecting end of the bush. When so assembled, the bush is wholly enclosed, but preferably a slight clearance is left between the peripheral edges of the stepped parts of the halves so as to ensure tight contact between the contiguous faces of the bosses. The said peripheral edges are then united by welding or brazing as indicated at $h$, the edges having been previously bevelled or otherwise shaped to form a circumferential groove for reception of the welding or brazing material.

By this invention a light and strong piston can be constructed in a simple and satisfactory manner. The advantage possessed by the construction above described, as compared with conventional constructions in which the piston consists of a plurality of parts, is that the bush which interconnects the halves lies wholly within the bosses and cannot become detached or caused to project beyond either of the end faces of the piston in the event of its becoming slack when the piston is in use, and the welding or brazing is effected at a position where it can have no adverse effect on uniformity of wear of the piston when in use.

Having thus described my invention what I claim as new and desire to secure by Letters Patent is:

A piston comprising a pair of coaxially arranged similar halves provided with central hollow bosses which at their adjacent ends are in contact with each other, and are internally enlarged and screw threaded, and a complementary screw threaded bush interconnecting the screw-threaded ends of the bosses, the adjacent ends of the outer peripheral portions of the two halves being stepped to provide jointly a circumferential groove around the piston, and the contiguous edges of the steps being united by a metallic bonding agent.

References Cited in the file of this patent

UNITED STATES PATENTS 2,352,041     Van Den Berg _____ June 20, 1944

FOREIGN PATENTS 495,621     Belgium _____ Sept. 1, 1950
684,171     Great Britain _____ Dec. 10, 1952